(12) United States Patent  
Park et al.

(10) Patent No.: US 8,145,926 B2
(45) Date of Patent: Mar. 27, 2012

(54) FAN SPEED CONTROL OF SILICON BASED DEVICES IN LOW POWER MODE TO REDUCE PLATFORM POWER

(75) Inventors: Hee-jun Park, Portland, OR (US); John Wallace, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 662 days.

(21) Appl. No.: 12/242,883

(22) Filed: Sep. 30, 2008

(65) Prior Publication Data

US 2010/0083018 A1 Apr. 1, 2010

(51) Int. Cl.
*G06F 1/26* (2006.01)
*G05D 23/00* (2006.01)

(52) U.S. Cl. .................. 713/320; 165/287
(58) Field of Classification Search .......... 713/320, 713/322, 323, 324, 340; 165/278
See application file for complete search history.

(56) References Cited

U.S. PATENT DOCUMENTS

| | | | | |
|---|---|---|---|---|
| 6,134,667 A * | 10/2000 | Suzuki et al. | ................. | 713/300 |
| 6,349,385 B1 * | 2/2002 | Kaminski et al. | ............ | 713/300 |
| 7,401,644 B2 * | 7/2008 | Ziarnik et al. | ................ | 165/287 |
| 7,489,092 B1 * | 2/2009 | Larky et al. | ..................... | 318/34 |
| 2002/0152406 A1 * | 10/2002 | Watts et al. | ................... | 713/300 |
| 2003/0120394 A1 * | 6/2003 | Ziarnik | ........................ | 700/300 |
| 2005/0030171 A1 * | 2/2005 | Liu et al. | ........................ | 340/500 |
| 2005/0049729 A1 * | 3/2005 | Culbert et al. | .................. | 700/50 |
| 2005/0174737 A1 * | 8/2005 | Meir | ............................. | 361/697 |
| 2005/0178133 A1 * | 8/2005 | Henry et al. | .................... | 62/186 |
| 2005/0210896 A1 * | 9/2005 | Durant et al. | ................... | 62/178 |
| 2006/0054713 A1 * | 3/2006 | Wang et al. | ................... | 236/49.3 |
| 2006/0095796 A1 * | 5/2006 | Chotoku et al. | ............. | 713/300 |
| 2006/0228223 A1 * | 10/2006 | Chen et al. | ................... | 417/44.1 |
| 2008/0296009 A1 * | 12/2008 | Ziarnik et al. | ................ | 165/287 |

* cited by examiner

*Primary Examiner* — Thomas Lee
*Assistant Examiner* — Phil Nguyen
(74) *Attorney, Agent, or Firm* — Ryder, Lu, Mazzeo and Konieczny, LLC; Douglas J. Ryder

(57) ABSTRACT

In general, in one aspect, the disclosure describes running a cooling fan within a computer at low speed while the computer is in low temperature operations (e.g., idle). The operation of the cooling fan may reduce processor (CPU) temperature enough to decrease processor leakage power, offsetting the power consumption of the fan, and possibly resulting in a net system power reduction. The benefit at the platform level increases further when considering the low efficiency of voltage regulation (VR) in this lower power regime, and potentially reductions in other components (e.g., graphics processor). The optimal fan speed is the speed at which the overall system power is reduced the most (e.g., processor power savings is greater than fan power utilized). The optimal temperature may be determined dynamically during operation or may be determined in manufacturing and applied statically during operation.

13 Claims, 4 Drawing Sheets

FIG. 6

$$P_{wall} = E_{ACbrick}^{-1} \cdot \left( E_{fanVR}^{-1} \cdot P_{fan} + E_{coreVR}^{-1} \cdot P_{core} + E_{etcVR}^{-1} \cdot P_{etc} \right)$$

$$P_{fan} = \sqrt[3]{\frac{1}{c_3 \cdot c_1^3} \cdot \left( \frac{V_{core} \cdot I_{sb,ref\ of\ core\ N} \cdot \left[ e^{m \cdot (V_{core} - V_{core,ref})} + n \cdot (T_j - T_{j,ref}) \right]}{T_j - T_{amb}} \right)} - c_2$$

$$P_{CPU} = V_{core} \cdot I_{sb,ref\ of\ core\ N} \cdot \left[ e^{m \cdot (V_{core} - V_{core,ref})} + n \cdot (T_j - T_{j,ref}) \right]$$

FAN SPEED CONTROL OF SILICON BASED DEVICES IN LOW POWER MODE TO REDUCE PLATFORM POWER

BACKGROUND

Fans may be utilized in computer systems to provide cooling. The fans are used to provide cooling to the central processing unit (CPU) and other components (e.g., processors) that generate large amounts of heat. The fans are typically turned on when the temperate of the CPU exceeds some threshold temperature. The use of the fans can reduce the temperature of the CPU and accordingly the leakage current and power consumption. In order to conserve the power consumed by the fan, the fan is typically turned off when the CPU is below some temperature or when the system is receiving power from the battery (e.g., system is unplugged) and battery conservation is desired.

BRIEF DESCRIPTION OF THE DRAWINGS

The features and advantages of the various embodiments will become apparent from the following detailed description in which:

FIG. 6 illustrates an example algorithm that may be utilized to determine a target temperature and optimal fan speed based on system parameters, according to one embodiment.

DETAILED DESCRIPTION

Figure 1:
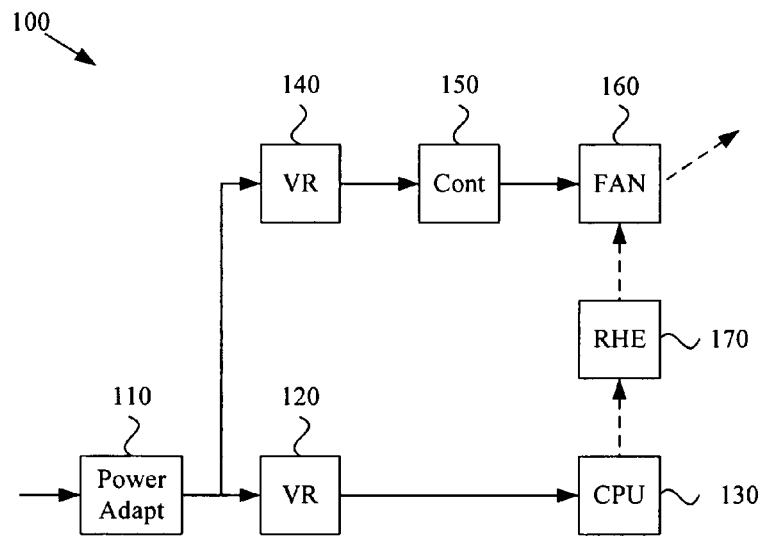
FIG. 1 illustrates a block diagram of an example computer system with cooling provided by a fan.

FIG. 1 illustrates a block diagram of an example computer system 100 with cooling provided by a fan. The computer 100 receives power from at a power adapter 110 that converts the AC power from a wall socket to DC power utilized by the computer 100. The power adapter 110 provides the power to a voltage regulator (VR) 120 to generate a regulated voltage for use by a central processing unit (CPU) 130. The power adapter 110 also provides the power to a VR 140 to generate a regulated voltage for use by a fan controller 150 and a fan 160. A remote heat exchanger (RCE) 170 is utilized to extract heat from the CPU 130 and provide it to a location where the fan 160 provides cooling thereto. A target temperature is the temperature at which the computer 100 is desired to operate. The target temperature may vary based on the operations of the computer 100.

As the target temperature increases, the fan will not be required to operate as much and the power consumed by the fan will be reduced. Alternatively, as the target temperature increases the CPU temperature increases and the leakage current increases resulting in the power consumed by the CPU being increased. The overall power consumed by the system 100 is based on the power consumed by the fan 160, the CPU 130, and other functions (not illustrated) as well as the efficiency of the VRs 120, 140, the fan controller 150 and other functions. The efficiencies of the VRs 120, 140 may vary based, for example, on the operating power and temperature of the system 100.

Figure 2:
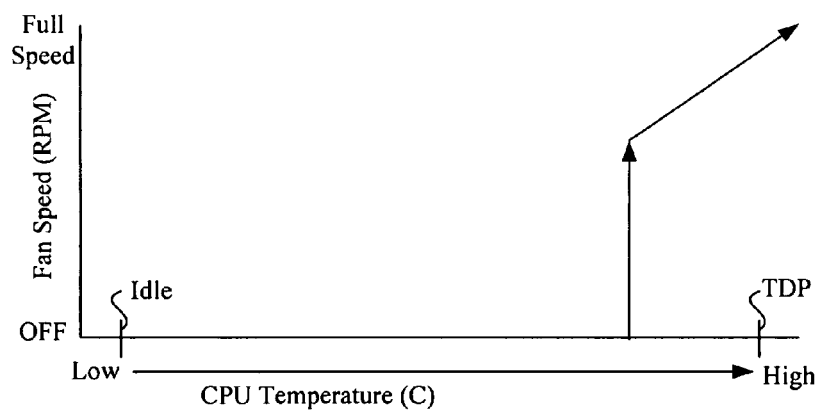
FIG. 2 illustrates a graph of an example implementation of the fan based on temperature of the CPU.

FIG. 2 illustrates a graph of an example implementation of the fan based on temperature of the CPU. Typically for low temperature (low power) operations or when the CPU is in a low temperature (low power) state, such as during CPU idle, the fan is not turned on in order to save the power required to operate the fan. Once the CPU gets into higher temperature (higher power) operations associated with an operational CPU and approaches the thermal design power (TDP) of the CPU, the fan will turn on and the speed of the fan will increase with the temperature increase of the CPU.

During low temperature operations (e.g., idle) it is possible to reduce the power consumed by the CPU by cooling the CPU (reduce target temperature). The power consumed by the fan increases in order to reduce the target temperature. As the power of the CPU and the power of the fan are inversely related to one another the overall affect on the power of the system needs to be examined. In addition to reducing the temperature and power of the CPU, the operation of the fan may reduce the temperature and power of other components in the system (e.g., graphics processor). There may be a speed for which the fan may be operated that results in a maximum power savings during lower temperature (low power) operations.

Figure 3A:
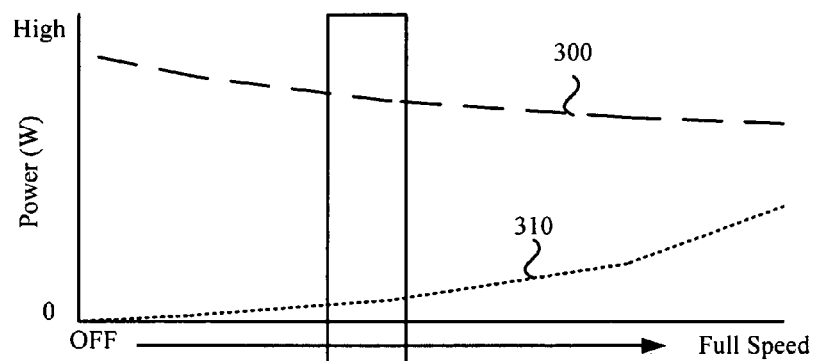
FIG. 3A illustrates a graph of example power consumptions of the CPU and fan for increasing fan speeds during low temperature operations, according to one embodiment.

FIG. 3A illustrates a graph of example power consumptions of the CPU 300 and fan 310 for increasing fan speeds during low temperature (low power) operations. As the fan speed increases the power consumed by the CPU 300 reduces as the temperature and leakage current are reduced. As the fan speed increases the power consumed by the fan 310 increases.

Figure 3B:
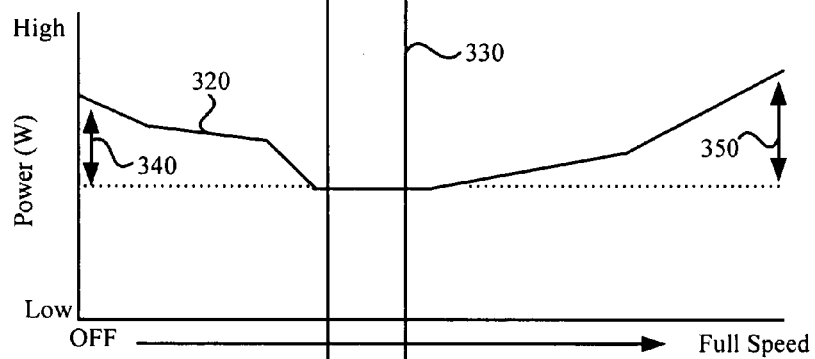
FIG. 3B illustrates a graph of an example overall system power consumption as the speed of the fan increases, according to one embodiment.

FIG. 3B illustrates a graph of an example overall system power consumption 320 as the speed of the fan increases. The overall power consumption 320 reduces as the fan is turned on and increases in speed. At this point, the power required to operate the fan is less than the power conserved by reducing the temperature of the CPU (as well as power possibly saved by reducing the temperature of other components). At a certain fan speed the overall power consumption 320 reaches a minimum (the optimal speed 330). As the fan speed continues to increase from the optimal speed, the overall power consumption 320 begins to increase again. At this point, the power required to increase the speed of the fan is more than the power savings provided by reducing the temperature of the CPU (and other components). A first power savings 340 may be achieved by turning the fan on and increasing the fan speed to the optimal speed 330. A second power savings 350 may be achieved by reducing the fan speed from full speed to the optimal speed 330.

Figure 3C:
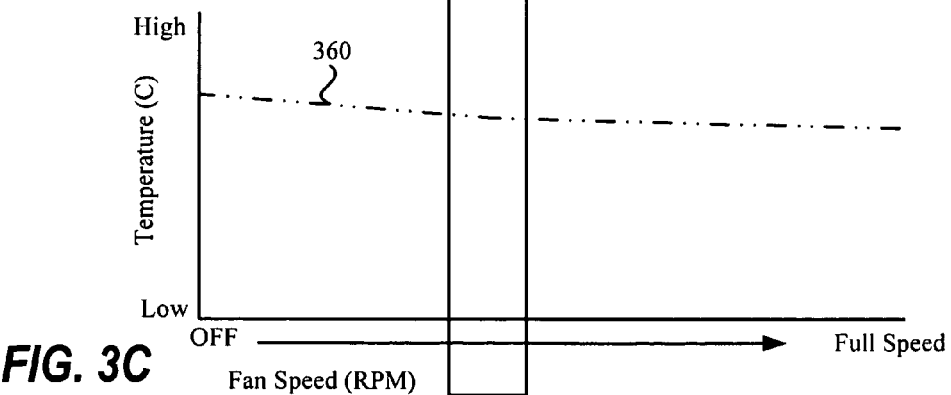
FIG. 3C illustrates a graph of an example overall system temperature as the speed of the fan increases, according to one embodiment.

FIG. 3C illustrates a graph of an example overall system temperature 360 as the speed of the fan increases. The overall system temperature 360 is reduced as the fan is turned on and the speed is increased. At some point, the overall temperature may level off or even increase if the power and heat required to run the fan exceeds the heat reduction in the CPU (and other components).

The control of the fan during low temperature (low power) operations may be controlled dynamically or statically. For dynamic control the system may make decisions about increasing or decreasing the fan speed based on measurements made during operation of the system. For example, the system may take measurements regarding the power consumed by the fan and CPU during operation. The system may also take measurements regarding the power consumed by other components (e.g., graphics processor). The fan, CPU and other components may require the addition of one or more sense resisters to measure power if not already provided.

Rather than measuring CPU power, the CPU may measure the temperature and use existing leakage current characteristics to determine the leakage current (and power) based thereon. The other components (e.g., graphics processor) may also calculate power consumption in a similar way. Alternatively, the system may utilize operating system (OS) estimates of platform power utilized for battery life projection to estimate the power consumption.

Regardless of how the power consumption is measured or calculated, the system may calculate the overall power of the system for a certain fan speed (e.g., measure prior to initiation of the fan). The fan speed may then be adjusted and the overall system power may be calculated again. If the overall system power was reduced the fan speed was adjusted in the correct direction while if the overall power increased the fan speed was either adjusted in the wrong direction or the previous value may be the optimal value.

Figure 4:
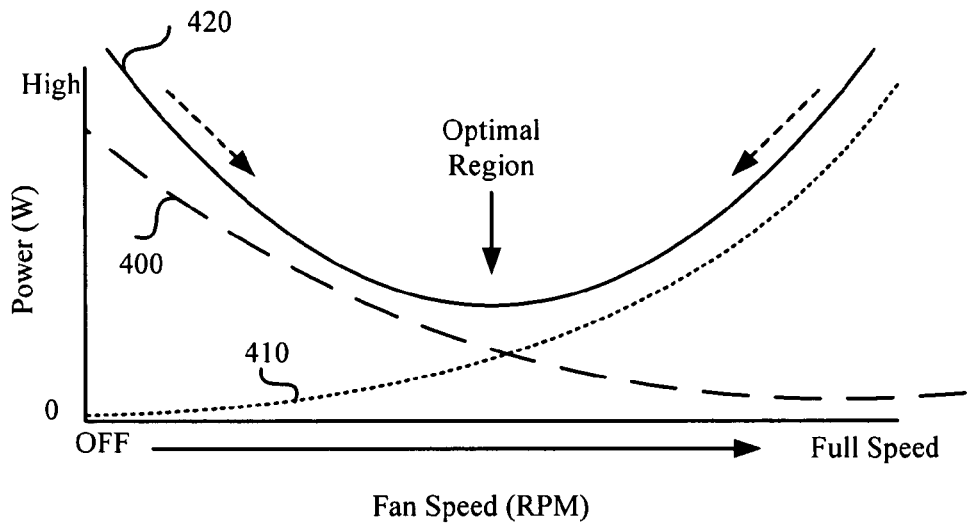
FIG. 4 illustrates a graph of a dynamic implementation of adjusting fan speed to select an optimal speed for power conservation for low temperature (low power) operations, according to one embodiment.

FIG. 4 illustrates a graph of a dynamic implementation of adjusting fan speed to select an optimal speed for power conservation. The CPU power 400 and the fan power 410 are measured/determined for an initial fan speed (e.g., off). A determination is made as to the overall system power 420. As illustrated, the overall system power 420 is simply based on CPU power 400 and fan power 410. The overall system power may also take into account the power of other components (e.g., graphics processor) that may be affected by cooling.

The fan speed is then adjusted (e.g., to a faster speed) and the CPU power 400 and fan power 410 are measured/determined again and the system power 420 is determined. The measurement/determination of CPU power 400 and fan power 410 may be made after the fan has been running at the new speed for some period (e.g., time, cycles). If the change in system power 420 was negative meaning that the overall system power 420 was reduced the fan speed was adjusted correctly. For example, as the fan speed is initially increased the system power 420 will be reduced (left side of system power 420 curve). The fan will be incremented in the same direction as long as a determination is made that the system power 420 is being reduced.

When the system power 420 increases the fan speed was adjusted too much in the particular direction (e.g., for fan speed increase the fan power 410 required to operate the fan at the additional speed is more than savings in CPU power 400 at the lower temperature). The fan speed is adjusted in the opposite direction and the system power 420 is determined again. Eventually, an optimal fan speed will be determined that provides the lowest system power 420 (e.g., lowest point on system power curve, point on system power curve where slope equals 0).

It is possible that the measurements result in the fan speed oscillating back and forth between two speeds. The optimal fan speed may be selected from one of those speeds or the system may allow the fan speed may oscillate back and forth. If the optimal fan speed is selected the fan may continue to operate at that speed. The system may at times adjust the fan speed from the selected optimal speed to determine if the fan speed is still optimal. The adjustment to the optimal fan speed may be done at defined periods (e.g., time, cycles) or may be based on some system parameters (e.g., change in system status, change in system temperature).

The adjustments to the fan speed may be same for each adjustment period or may vary based on conditions. For example, the fan speed may be implemented in certain increments while the system power is decreasing, and then the increments may be reduced each time a determination is made that the system power increased.

Figure 5:
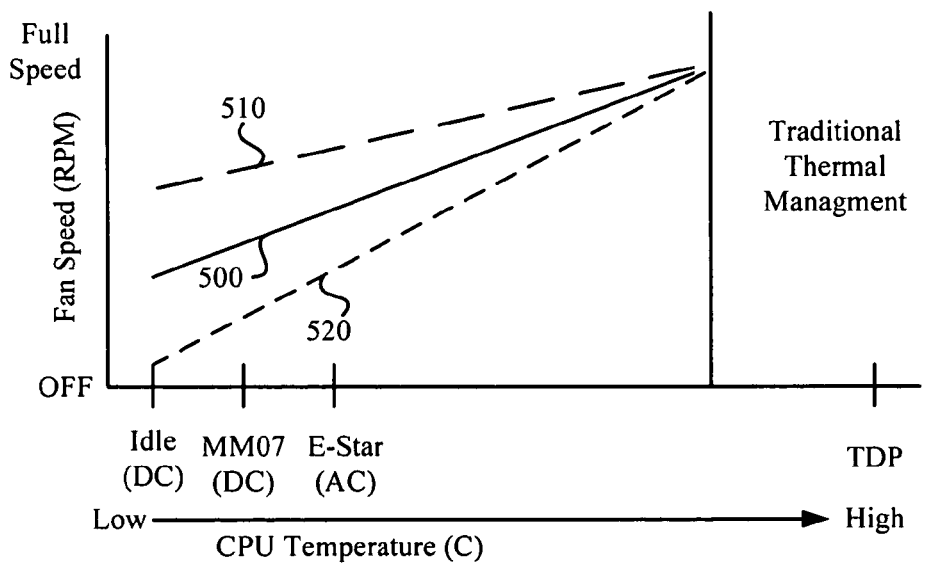
FIG. 5 illustrates a graph illustrating an example static implementation of optimal fan speed over CPU temperature for low temperature (low power) operations, according to one embodiment.

FIG. 5 illustrates a graph illustrating an example static implementation of optimal fan speed 500 over CPU temperature for low temperature (low power) operations. The optimal fan speed 500 may be calculated by an engineer at the time the computer is designed or may be calculated by an algorithm used to calculate optimal fan speed based on system parameters. The optimal fan speed may be a parameter defined in the fan controller, and the fan may operate at the defined speed based on the temperature of the CPU.

As the optimal fan speed 500 is determined during the design of the system the optimal fan speed may not equate to what would be optimal in operation due to, for example, manufacturing or operational differences. For example, if the dynamic method of defining the optimal fan speed was utilized it may determine an optimal fan speed 510 that is above the static optimal fan speed 500. Accordingly, the system power savings may not be as much as it could have been if the fan speed was increased (e.g., on left side of FIG. 4). If the dynamic method determined that an optimal fan speed 520 below the static optimal fan speed 500. In this case, the system power savings may not be as much as it could have been had the fan speed been reduced (e.g., on right side of FIG. 4). Whether the static optimal fan speed 500 is optimal in operation or not, use of the static optimal fan speed 500 provides system power savings that would not be available if the fan was not run during low temperature (low power) operations.

FIG. 5 includes some typical low power benchmarks (idle mode, mobile mark 2007 (MMO7), and Energy Star) overlaid over the CPU temperature (the placement is relative as the CPU temperature for these benchmarks may vary based on different parameters. MM07 is a benchmark for limited CPU operations associated with conserving battery life in a portable computer and Energy Star is a benchmark for reducing energy. Utilizing the fan during these low power operations may reduce power consumed and conserve energy, and accordingly assist the systems meet these benchmarks.

FIG. 6 illustrates an example algorithm that may be utilized to determine a target temperature and optimal fan speed based on system parameters. The algorithm may be utilized for any system where the parameters are known and may not require excessive experimentation by the engineer.

Although the disclosure has been illustrated by reference to specific embodiments, it will be apparent that the disclosure is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims.

What is claimed:

1. A method comprising
   determining a processor within a system is operating in a low temperature state, wherein while the processor is operating in the low temperature state the processor does not require cooling and a fan within the system used to cool the processor is typically off or operating at a low speed;
   determining a preferred speed for the fan to operate at in order to reduce system power when the processor is operating in the low temperature state, wherein the system power includes processor power and fan power, wherein the system power is reduced when the processor power saved by cooling the processor operating in the low temperature state with the fan operating at the preferred speed outweighs the fan power required to operate the fan at the preferred speed, and wherein the determining a preferred speed for the fan includes
      measuring the processor power and the fan power when it is initially determined that the processor is operating in a low temperature state prior to any fan speed adjustments,
      calculating the system power prior to any fan speed adjustments,
      increasing the fan speed,
      measuring the processor power and the fan power for the increased fan speed,
      calculating the system power for the increased fan speed,
      dynamically adjusting the fan speed based on changes to the system power,
      measuring the processor power and the fan power for the dynamically adjusted fan speed,
      calculating the system power for the dynamically adjusted fan speed, and
      selecting the preferred speed when the system power is determined to be substantially at lowest value; and
   running the fan at the preferred speed when the processor is operating in the low temperature state.

2. The method of claim 1, wherein the determining a processor within a system is operating in a low temperature state includes determining the processor is operating in an idle mode.

3. The method of claim 1, further comprising determining processor temperature and statically determining the increased speed for the fan based on the processor temperature.

4. The method of claim 3, wherein the statically determining the increased speed for the fan includes selecting the increased speed from a processor temperature to increased fan speed linkage.

5. The method of claim 3, further comprising defining the processor temperature to increased fan speed linkage in the system.

6. The method of claim 1, further comprising validating the preferred speed selected for the fan at certain times, wherein the validating includes
   adjusting the fan speed from the preferred speed selected,
   measuring the processor power and the fan power for the adjusted fan speed;
   calculating the system power for the adjusted fan speed; and
   analyzing changes to the system power.

7. The method of claim 6, wherein the certain times that fan speeds are validated include at least one of defined intervals and changes in system parameters.

8. A system comprising
   a fan;
   a processor; and
   a fan controller to control the operation of the fan,
   wherein the processor is to
      measure the processor power and the fan power when the processor is operating in a low temperature state prior to any fan speed adjustments;
      calculate the system power prior to any fan speed adjustments;
      instruct the fan controller to increase the fan speed;
      measure the processor power and the fan power for the increased fan speed;
      calculate the system power for the increased fan speed;
      dynamically determine adjustments to the fan speed based on changes to the system power and instruct the fan controller accordingly;
      measure the processor power and the fan power for the dynamically adjusted fan speed;
      calculate the system power for the dynamically adjusted fan speed; and
      select the preferred speed when the system power is determined to be substantially at lowest value and instruct the fan controller accordingly, and
   wherein the fan controller is to
      operate the fan at the preferred speed in order to reduce system power when the processor is operating in a low temperature state that does not require cooling, wherein the system power includes processor power and fan power, and wherein the system power is reduced when the processor power saved by cooling the processor operating in the low temperature state with the fan operating at the preferred speed outweighs the fan power required to operate the fan at the preferred speed.

9. The system of claim 8, wherein the processor is further to determine a processor temperature and statically select the increased speed for the fan based on the processor temperature.

10. The system of claim 8, wherein the processor is also to validate the preferred speed selected for the fan at certain times, wherein the validating includes
    adjusting the fan speed from the preferred speed selected and instructing the fan controller accordingly,
    measuring the processor power and the fan power for the adjusted fan speed;
    calculating the system power for the adjusted fan speed; and
    analyzing changes to the system power.

11. The system of claim 10, wherein the certain times that the processor is also to validate the preferred speed selected for the fan includes at least one of defined intervals and changes in system parameters.

12. A system comprising
    a processor to perform various operations;
    a fan to provide cooling of the processor; and
    a fan controller to control the operation of the fan,
    wherein the processor is further to determine a preferred speed for the fan to operate at in order to reduce system power when the processor is operating in a low temperature state that does not require cooling, wherein the system power includes processor power and fan power, wherein the system power is reduced when the processor power saved by cooling the processor operating in the low temperature state with the fan operating at the preferred speed outweighs the fan power required to operate the fan at the preferred speed, and wherein the processor determines the preferred speed by determining the processor power and the fan power when the processor is operating in a low temperature state prior to any fan speed adjustments;

calculating the system power prior to any fan speed adjustments;

increasing the fan speed;

determining the processor power and the fan power for the increased fan speed;

calculating the system power for the increased fan speed;

dynamically determining adjustments to the fan speed based on changes to the system power;

determining the processor power and the fan power for the dynamically adjusted fan speed;

calculating the system power for the dynamically adjusted fan speed; and selecting the preferred speed when the system power is determined to be substantially at lowest value.

13. The system of claim 12, wherein the processor determines the increased speed by measuring temperature of the processor, and statically selecting the increased speed for the fan based on the processor temperature.

* * * * *